US006849691B2

(12) United States Patent
Nomura et al.

(10) Patent No.: US 6,849,691 B2
(45) Date of Patent: Feb. 1, 2005

(54) HIGH DAMPING ELASTOMER COMPOSITION

(75) Inventors: Takeshi Nomura, Komaki (JP); Kazunobu Hashimoto, Nagoya (JP)

(73) Assignee: Tokai Rubber Industries, Ltd., Komaki (JP)

(*) Notice: Subject to any disclaimer, the term of this patent is extended or adjusted under 35 U.S.C. 154(b) by 0 days.

(21) Appl. No.: 09/985,330

(22) Filed: Nov. 2, 2001

(65) Prior Publication Data

US 2002/0103297 A1 Aug. 1, 2002

(30) Foreign Application Priority Data

Nov. 2, 2000 (JP) ....................................... 2000-336147

(51) Int. Cl.[7] ......................... C08L 53/02; C08L 95/00; C08L 93/04

(52) U.S. Cl. ............................ 525/88; 525/89; 525/98; 525/314; 524/485; 524/486; 524/490; 524/505; 524/270

(58) Field of Search ............................. 525/88, 89, 98, 525/314; 524/490, 505, 270, 485, 486; 428/52

(56) References Cited

U.S. PATENT DOCUMENTS

| | | | | |
|---|---|---|---|---|
| 5,260,370 A | | 11/1993 | Kang et al. | 524/575 |
| 5,331,036 A | | 7/1994 | Kang et al. | 524/474 |
| 5,633,286 A | * | 5/1997 | Chen | 524/505 |
| 5,891,957 A | * | 4/1999 | Hansen et al. | 525/89 |
| 6,329,459 B1 | * | 12/2001 | Kang et al. | 525/88 |

FOREIGN PATENT DOCUMENTS

| | | |
|---|---|---|
| EP | 0397001 | 11/1990 |
| JP | 58-215435 | 12/1983 |
| JP | 62-043443 | 2/1987 |
| JP | 05-117491 | 5/1993 |
| JP | 05-279623 | 10/1993 |
| JP | 06-073243 | 3/1994 |
| JP | 07-197992 | 8/1995 |

* cited by examiner

*Primary Examiner*—James J. Seidleck
*Assistant Examiner*—Olga Asinovsky
(74) *Attorney, Agent, or Firm*—Armstrong, Kratz, Quintos, Hanson & Brooks, LLP

(57) ABSTRACT

A high damping elastomer composition that has a high damping capability and is superior in the temperature dependency of rigidity. The high damping elastomer composition has at least one styrene block polymer as a main component. The ratio of a diblock component in the overall styrene block polymer is in the range of 50 to 95 wt. %.

7 Claims, No Drawings

HIGH DAMPING ELASTOMER COMPOSITION

BACKGROUND OF THE INVENTION

1. Field of the Invention

The present invention relates generally to a high damping elastomer composition suitable for a vibration absorbing material a shock absorbing material, and the like, and, more particularly, the present invention relates to a high damping elastomer suitable for controlling and damping vibrations and the like in the field of construction, 2. Description of the Art Vibration control apparatus and base isolation devices in the construction field are used to prevent the vibrations of buildings due to vibrations generated by earthquakes, wind and the like, and due to traffic vibrations caused by large moving vehicles, etc., and the like. A damping material for vibration control apparatus, base isolation devices and the like is required to have vibration absorbing capability for vibrations of both small and large amplitudes due to the rigidity of buildings. Additionally, for stable damping in the Construction field, it is desirable that damping is stable in the atmosphere around the buildings and that rigidity is little dependent on temperature. Such damping materials conventionally include rubber compositions having rubber as a main component and further include a polymer with a high glass transition temperature (Tg), a resin with a high softening point, or the like.

However, in these conventional rubber compositions, a glass transition temperature (Tg) range wherein a tan δ (loss tangent) peak is found is mainly utilized to achieve large damping. Since this glass transition temperature (Tg) range is a range where a glass state rapidly transforms into a rubber state, rigidity is highly dependent on temperature, which may cause difficulties. For instance, the ratio (Ke10/Ke30) of equivalent rigidity at 10° C. (Ke10) to equivalent rigidity at 30° C. (Ke30) is two or higher in many cases.

SUMMARY OF THE INVENTION

Accordingly, under the above circumstances, it is an object of the present invention to provide a high damping elastomer composition that has a high damping capability and also is superior in temperature dependency of rigidity.

In order to achieve the above objects, the high damping elastomer composition of the present invention has at least one styrene block polymer as a main component. The phrase "main component" is defined as at least 30 wt. % of the subject elastomer composition. Preferably, the ratio of a diblock component in the overall styrene block polymer is in the range of 50 to 95 wt. %.

The present inventors have carried out thorough research mainly on styrene block polymers so as to obtain a high damping elastomer composition that has a high damping capability and is superior in the temperature dependency of rigidity. Ordinary thermoplastic elastomers have analogous crosslinking points due to hard segments such as frozen phases and hydrogen bonds at a block component of triblock or higher, so that elasticity is generated thereby. The ends of long soft segments are not fixed at a diblock component and are highly mobile during use, causing sliding (viscosity) thereby. Thus, the present inventors focused on the characteristics of an elastomer at a block component of triblock or higher, as well as viscosity (damping properties) at a diblock component. The present inventors found that the objects mentioned above can be achieved by setting the ratio of a diblock component in an overall styrene block polymer at a specific range, and achieved the present invention. Unlike conventional damping elastomer compositions, the prevent invention does not utilize a glass transition temperature (Tg) range for damping performance for the high damping elastomer composition. Consequently, the high damping elastomer composition of the present invention shows extremely low dependency on temperature.

DESCRIPTION OF THE PREFERRED EMBODIMENTS

Preferred embodiments of the present invention will be explained in detail hereinafter.

The high damping elastomer composition of the present invention contains at least one styrene block polymer as a main component. Importantly, the ratio of a diblock component in the overall styrene block polymer is in a specific range according to the present invention.

In the subject damping elastomer compositions, the diblock component has only one set each of hard segments and soft segments in the styrene block polymer. For instance, when a styrene block (a hard segment) and an isoprene block (a soft segment) are expressed as S and I, respectively, the diblock component has only one set each of the styrene blocks (S) and the isoprene blocks (I) such as . . . SSSSSSSIIIIIIIIIIII . . . Moreover, a block component is a triblock component when there are two sets of the styrene block (S) and one set of the isoprene block (I) as . . . SSSIIIIISSS . . . .

There is no particular limitation to the styrene block polymer as long as the block polymer has polystyrene as a hard segment and polydiene such as polyisoprene and polybutadiene as a soft segment. Specifically, styrene block polymers of triblock or higher include styrene-isoprene-styrene block polymer (SIS), styrene-butadiene-styrene block polymer (SBS), styrene-ethylene/butylene-styrene block polymer (SEBS), styrene-ethylene/propylene-styrene block polymer (SEPS), and the like. Moreover, diblock styrene polymers include styrene-isoprene block polymer (SI), styrene-butadiene block polymer (SB), styrene-ethylene/butylene block polymer (SEB), styrene-ethylene/propylene block polymer (SEP), and the like. These styrene block polymers may be used alone or in combination with one or more kinds thereof.

The number average molecular weight (Mn) of the styrene block polymers is normally 300,000 or less, and more preferably, in the range of 100,000 to 200,000.

The ratio of the diblock component in the overall styrene block polymer should be in the range of 50 to 95 wt %, and more preferably, 55 to 80 wt. % according to the present invention. When the ratio of the diblock component is lees than 50 wt. %, the ratio of a block component of triblock or higher becomes so large that damping properties are degraded. On the other hand, when the ratio of a diblock component exceeds 95 wt. %, cold flowability and heat resistance deteriorate sharply Methods of establishing the ratio of the diblock component in the overall styrene block polymer in the range of 50 to 95 wt. % include, for instance, a method of using only a styrene block polymer (a) in which the ratio of the diblock component is in the range of 50 to 95 wt. %; a method of using a styrene block polymer (b) in which the overall ratio of the diblock component is less than 50 wt. % and using a styrene block polymer (c) in which the overall ratio of the diblock component exceeds 95 wt. %, and using a mixture of polymers (b) and (c) such that the ratio of the diblock component in the total weight of (b) and (c) is in the range of 50 to 95 wt. %; and the like.

Specific examples of the styrene block polymer (a) include SIS (Kraton D1113 manufactured by KRATON Polymers; diblock component of 55 wt. %) and SIS (Quintac 3520 manufactured by Nippon Zeon Company Ltd.; diblock component of 78 wt. %).

Examples of the styrene block polymer (b) specifically include SEPS (Kraton G1730 manufactured by KRATON Polymers; diblock component of 0 wt. %) and SIS (Kraton D1112 manufactured by KRATON Polymers; diblock component of 40 wt. %).

An example of the styrene block polymer (c) specifically includes SEP (Kraton G1701 manufactured by KRATON Polymers; diblock component of 100 wt. %).

Additionally, it is preferable to include a tackifier and/or a plasticizer, in addition to the styrene block polymer, in the high damping elastomer compositions of the present invention.

The tackifier is used so as to enhance damping and adhesive properties. For instance, it is preferable to use as a tackifier a hydrogenated alicyclic hydrocarbon resin, a coumarone resin, rosin, rosin ester, a terpene phenol resin, a ketone resin, a dicyclopentadiene resin, a maleic resin, an epoxy resin, an urea resin, a melamine resin, and the like. These tackifiers may be used alone or in combination with one or more kinds thereof.

The ratio of the tackifier is preferably 200 weight parts (mentioned as parts hereinafter) or less, and more preferably, 20 to 100 parts relative to 100 parts of the styrene block polymer.

The plasticizer adjusts hardness and the like, and may include plasticizers such as, for instance, synthetic plasticizers such as dioctyl phthalate (DOP), and mineral oils such as paraffin oil, aromatic oil and the like.

The ratio of the plasticizer is preferably 200 parts or less, and more preferably, 50 to 120 parts relative to 100 parts of the styrene block polymer.

Furthermore, the high damping elastomer composition of the present invention may include a reinforcing material, a filler, a curing agent, a vulcanizing accelerator, an antioxidant (an age resistor), and the like, in addition to each component mentioned above.

Suitable reinforcing materials include, for example, carbon black, silica, and the like. Suitable fillers include, for instance, calcium carbonate, mica, graphite, magnesium oxide, and the like.

Suitable curing agents include, for example, sulfur, organic peroxides, alkyl phenol resins, and the like Usable vulcanizing accelerators include, for instance, a sulfenamide vulcanizing accelerator, a benzothiazole vulcanizing accelerator, a thiuram vulcanizing accelerator, and the like Suitable antioxidants (age resistors) include, for example, a dithiocarbamate-based antioxidant such as zinc dibuyl dithiocarbamate, a phenol-based antioxidant, and the like.

The high damping elastomer composition of the present invention can be made by kneading each component mentioned above with, for instance, a kneader, a planetary mixer, a mixing roll, a biaxial screw type stirrer, and the like. The high damping elastomer composition can be used as a product after heating and melting the composition at the melting temperature or higher, pouring it into a mold so as to mold it into a predetermined shape, and then allowing it to cool.

The high damping elastomer composition of the present invention is suitable for vibration control apparatus such as vibration control walls for construction and vibration control dampers, and base isolation devices in the construction field. Moreover, the high damping elastomer composition can be used as vibration control dampers for home electric appliances, vibration control dampers for electronic equipment, vibration-damping materials, vibration-damping materials for vehicles, shock absorbing materials, and the like.

Examples of the compositions of the invention along with comparative examples are set forth in the following.

The following materials were first provided.

Styrene Block Polymer (a)-1

SIS-Kraton D1113 manufactured by KRATON Polymers; diblock component of 55 wt. %

Styrene Block Polymer (a)-2

SIS-Quintac 3520 manufactured by Nippon Zeon Company Ltd.; diblock component of 78 wt. %

Styrene Block Polymer (b)-1

SEPS-Kraton G1730 manufactured by KRATON Polymers; diblock component of 0 wt. %

Styrene Block Polymer (b)-2

SIS-Kraton D1112 manufactured by KRATON Polymers; diblock component of 40 wt. %

Styrene Block Polymer (c)

SEP-Kraton G1701 manufactured by KRATON Polymers; diblock component of 100 wt. %

Hydrogenated Terpene Resin

CLEARON P85 manufactured by Yasuhara Chemical Co., Ltd.

Maleic Modified Rosin

MALKYD No. 8 manufactured by Arakawa Chemical Industries, Ltd.

Precipitated Calcium Carbonate Light

Silver W (calcium carbonate) manufactured by Shiraishi Calcium Co., Ltd.

Naphthene Oil

Diana Process Oil NM280 manufactured by Idemitsu Kosan Co., Ltd.

Phenol-based Antioxidant

Irganox 1010 manufactured by Ciba-Geigy, Inc.

EXAMPLES 1 TO 7, COMPARATIVE EXAMPLES 1 AND 2

The components shown in the following Table 1 and Table 2 were mixed at the ratio shown in the tables, and were kneaded by a kneader, thus producing elastomer compositions.

TABLE 1

| | | Examples | | | | | |
|---|---|---|---|---|---|---|---|
| | | 1 | 2 | 3 | 4 | 5 | 6 |
| Styrene block polymer | (a)-1 (55 wt. %) | — | — | — | — | — | 100 |
| | (a)-2 (78 wt. %) | 100 | 100 | 100 | 100 | — | — |
| | (b)-1 (0 wt. %) | — | — | — | — | 40 | — |
| | (b)-2 (40 wt. %) | — | — | — | — | — | — |
| | (c) (100 wt. %) | — | — | — | — | 60 | — |
| Hydrogenated terpene resin | | 40 | — | — | — | — | — |

TABLE 1-continued

| | Examples | | | | | |
|---|---|---|---|---|---|---|
| | 1 | 2 | 3 | 4 | 5 | 6 |
| Maleic modified rosin | — | 20 | 20 | — | — | 20 |
| Precipitated calcium carbonate light | — | — | 20 | — | — | — |
| Naphthene oil | 50 | 80 | 100 | 120 | 120 | 80 |
| Antioxidant | 3 | 3 | 3 | 3 | 3 | 3 |
| Ratio of diblock component in overall styrene block polymer (wt. %) | 78 | 78 | 78 | 78 | 60 | 55 |

(in weight parts)

TABLE 2

| | | Example | Comparative Examples | |
|---|---|---|---|---|
| | | 7 | 1 | 2 |
| Styrene block polymer | (a)-1 (55 wt. %) | — | — | — |
| | (a)-2 (78 wt. %) | — | — | — |
| | (b)-1 (0 wt. %) | 5 | — | — |
| | (b)-2 (40 wt. %) | — | 100 | — |
| | (c) (100 wt. %) | 95 | — | 100 |
| Hydrogenated terpene resin | | — | — | — |
| Maleic modified rosin | | 20 | 20 | 20 |
| Precipitated calcium carbonate light | | — | — | — |
| Naphthene oil | | 100 | 80 | 80 |
| Antioxidant | | 3 | 3 | 3 |
| Ratio of diblock component in overall styrene block polymer (wt. %) | | 95 | 40 | 100 |

(in weight parts)

The elastomer compositions of the Examples and Comparative Examples were evaluated for various characteristics based on the following standards. The results of these evaluations are shown in Tables 3 and 4 below.

Cold Flowability

The elastomer compositions were exposed in an oven at 50° C. for 24 hours. Tested was whether or not the form or shape of each of the compositions was maintained. When the form was kept, the evaluation was ○, When a partial flow was detected, the evaluation was x.

Damping Characteristics

After a silicone U-shaped frame had been placed between two steel plates and the plates fastened with screws, the elastomer composition was inserted into the frame. Additionally, the elastomer composition was heated and melted at its melting temperature or higher. The bodies (100 mm×100 mm in size, and 6 mm in thickness) were melted and therefore bonded on inner surfaces of the steel plates, thus preparing a sample for evaluation. Damping characteristics were evaluated for each of the samples by using a shaker (DYNAMIC SERVO manufactured by Washimiya Seisakusho Co.), an input signal oscillator (Synthesized Function Generator FC320 manufactured by Yokogawa Electric Corp.), and an output signal processor (Portable FFT Analyzer CF-3200 manufactured by non Sokki Co., Ltd.) in accordance with the following Formulas (1) to (3) based on the analysis of shearing strain (δ) and load (Qd) relative to a period of vibrations under predetermined conditions. These measurement conditions were shearing strain (δ) of 200% relative to a material thickness; frequency (f) of 0.5 Hz; and measurement temperatures of 10° C. and 30° C. The results are shown in the following Tables 3 and 4.

$$\text{Equivalent rigidity: } Ke=Qd/\delta(kN/m) \quad (1)$$

$$\text{Equivalent damping coefficient: } Ce=\Delta W/\pi\omega\delta^2(kN\ s/m) \quad (2)$$

$$\text{Damping constant: } He=\Delta W/4\pi W \quad (3)$$

wherein $\omega=2\pi f$, $W=Ke\delta^2/2$, and $\Delta W$ indicates a load-strain loop area.

TABLE 3

| | Examples | | | | | |
|---|---|---|---|---|---|---|
| | 1 | 2 | 3 | 4 | 5 | 6 |
| Cold flowability | ○ | ○ | ○ | ○ | ○ | ○ |
| 10° C. | | | | | | |
| Equivalent Rigidity (Ke) | 62.425 | 34.615 | 28.512 | 19.28 | 83.654 | 48.53 |
| Equivalent damping coefficient (Ce) | 15.043 | 9.887 | 8.325 | 4.704 | 19.24 | 8.978 |
| Damping constant (He) | 0.31 | 0.449 | 0.459 | 0.383 | 0.335 | 0.31 |
| Tanδ | 0.316 | 0.643 | 0.599 | 0.652 | 0.752 | 0.595 |
| 30° C. | | | | | | |
| Equivalent Rigidity (Ke) | 31.808 | 22.594 | 20 | 12.81 | 45.352 | 31.808 |
| Equivalent damping coefficient (Ce) | 6.619 | 6.819 | 6.24 | 3.279 | 10.658 | 6.362 |
| Damping constant (He) | 0.426 | 0.474 | 0.49 | 0.403 | 0.389 | 0.325 |
| tanδ | 0.633 | 0.767 | 0.627 | 0.805 | 0.701 | 0.619 |
| Ratio of equivalent rigidity (Ke10/Ke30) | 1.96 | 1.53 | 1.43 | 1.51 | 1.84 | 1.53 |
| Ratio of equivalent damping coefficients (Ce10/Ce30) | 1.75 | 1.45 | 1.33 | 1.43 | 1.81 | 1.41 |
| Ratio of damping constants (He10/He30) | 0.73 | 0.95 | 0.94 | 0.95 | 0.86 | 0.95 |
| Ratios of tanδ (10° C./30° C.) | 0.50 | 0.84 | 0.96 | 0.81 | 1.07 | 0.96 |

TABLE 4

| | | Example | Comparative Examples | |
|---|---|---|---|---|
| | | 7 | 1 | 2 |
| Cold flowability | | ○ | ○ | X |
| 10° C. | Equivalent Rigidity (Ke) | 66.923 | 68.425 | Immeasurable |

TABLE 4-continued

| | | Example | Comparative Examples | |
|---|---|---|---|---|
| | | 7 | 1 | 2 |
| | Equivalent damping coefficient (Ce) | 16.062 | 10.008 | |
| | Damping constant (He) | 0.421 | 0.252 | |
| | Tanδ | 0.881 | 0.316 | |
| 30° C. | Equivalent Rigidity (Ke) | 35.374 | 31.808 | |
| | Equivalent damping coefficient (Ce) | 8.844 | 4.91 | |
| | Damping constant (He) | 0.419 | 0.315 | |
| | Tanδ | 0.801 | 0.519 | |
| Ratio of equivalent rigidity (Ke10/Ke30) | | 1.89 | 2.15 | |
| Ratio of equivalent damping coefficients (Ce10/Ce30) | | 1.82 | 2.04 | |
| Ratio of damping constants (He10/He30) | | 1.00 | 0.80 | |
| Ratios of tanδ (10° C./30° C.) | | 1.10 | 0.61 | |

According to the above results, the ratio of equivalent rigidity at 10° C. to equivalent rigidity at 30° C. is 2.0 or less in all of the Examples. The ratio of damping constants and the ratio of tanδ are also roughly 1. Thus, the Examples have high damping characteristics and also are excellent in the temperature dependency of rigidity. In addition cold flowability is superior in the Examples.

To the contrary, Comparative Example 1 has a ratio of a diblock component in the styrene block polymer which is too low and a ratio of a block component of triblock or higher therein which is too high. It is to be noted that in this Comparative Example 1 the ratio of equivalent rigidity at 10° C. to equivalent rigidity at 30° C. exceeds 2.0, indicating that the Comparative Example 1 is inferior in the temperature dependency of rigidity. Moreover, in Comparative Example 2 since the ratio of a diblock component in the styrene block polymer is too high, its cold flowability is much inferior.

As described above, the high damping elastomer compositions of the present invention have at least one styrene block polymer as a main component. In the subject compositions, since the ratio of a diblock component in the overall styrene block polymer is within a specific range, a block component of triblock or higher has elastomer characteristics and a diblock component has viscous-body characteristics (damping properties). Unlike conventional compositions, the present invention does not utilize a glass transition temperature (Tg) for damping performance of the high damping elastomer composition. Thus, the high damping elastomer compositions of the present invention have excellent damping performance, are little dependent on temperature, and are superior in the temperature dependency of rigidity.

What is claimed is:

1. A high damping elastomer composition for controlling and damping vibrations in the field of construction, the composition comprising the following (A), (B) and (C), wherein a ratio of (B) is 20 to 100 weight parts relative to 100 weight parts of (A), and a ratio of (C) is 50 to 120 weight parts relative to 100 weights parts of (A):

(A) a styrene block copolymer consisting of styrene-isoprene-styrene block copolymer, wherein the styrene-isoprene-styrene block copolymer contains a styrene-isoprene diblock component at 50 to 95 wt. % in the overall styrene-isoprene-styrene block copolymer;

(B) a tackifier; and (C) a plasticizer.

2. The high damping elastomer composition according to claim 1, wherein the tackifier is at least one of a hydrogenated terpene resin and a maleic modified rosin.

3. The high damping elastomer composition according to claim 1, wherein the plasticizer is naphthene oil.

4. The high damping elastomer composition according to claim 1, further comprising a reinforcing material in addition to the above mentioned (A), (B) and (C).

5. The high damping elastomer composition according to claim 4, wherein the reinforcing material is a precipitated calcium carbonate light.

6. The high damping elastomer composition according to claim 1, further comprising an antioxidant in addition to the above mentioned (A), (B) and (C).

7. The high damping elastomer composition according to claim 6, wherein the antioxidant is a phenol-based antioxidant.

* * * * *